(12) United States Patent
Maki et al.

(10) Patent No.: US 12,063,551 B2
(45) Date of Patent: Aug. 13, 2024

(54) MOBILE STATION, BASE STATION, RECEPTION METHOD, AND TRANSMISSION METHOD

(71) Applicant: Panasonic Intellectual Property Corporation of America, Torrance, CA (US)

(72) Inventors: Shotaro Maki, Kanagawa (JP); Lilei Wang, Beijing (CN); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 326 days.

(21) Appl. No.: 17/593,681

(22) PCT Filed: Mar. 28, 2019

(86) PCT No.: PCT/CN2019/080048
§ 371 (c)(1),
(2) Date: Sep. 22, 2021

(87) PCT Pub. No.: WO2020/191702
PCT Pub. Date: Oct. 1, 2020

(65) Prior Publication Data
US 2022/0167212 A1    May 26, 2022

(51) Int. Cl.
*H04W 28/12* (2009.01)
*H04W 16/14* (2009.01)
(Continued)

(52) U.S. Cl.
CPC ........... *H04W 28/12* (2013.01); *H04W 16/14* (2013.01); *H04W 28/08* (2013.01); *H04W 72/23* (2023.01)

(58) Field of Classification Search
CPC ..... H04W 28/12; H04W 16/14; H04W 28/08; H04W 72/23
(Continued)

(56) References Cited

U.S. PATENT DOCUMENTS

| 10,979,194 B2 | 4/2021 | Li et al. |
| 2016/0174238 A1* | 6/2016 | Chen ..................... H04W 72/30 370/336 |

(Continued)

FOREIGN PATENT DOCUMENTS

| CN | 107734520 A * | 2/2018 | ........... H04L 1/0013 |
| CN | 108370579 A | 8/2018 | |

(Continued)

OTHER PUBLICATIONS

3GPP TS 37.213 V15.1.0, "3rd Generation Partnership Project; Technical Specification Group Radio Access Network; Physical layer procedure for shared spectrum channel access (Release 15)," Sep. 2018, 20 pages.

(Continued)

*Primary Examiner* — Chi H Pham
*Assistant Examiner* — Oladiran Gideon Olaleye
(74) *Attorney, Agent, or Firm* — Seed IP Law Group LLP

(57) ABSTRACT

Data communication can be appropriately performed in unlicensed bands. A mobile station (200) includes: reception circuitry, which, in operation, receives first information relating to a size configured for data, and second information relating to a resource to which the data is assigned; and control circuitry, which, in operation, controls reception of the data based on the first information and the second information.

10 Claims, 14 Drawing Sheets

(51) Int. Cl.
  *H04W 28/08* (2023.01)
  *H04W 72/23* (2023.01)
(58) Field of Classification Search
  USPC .......................................................... 370/329
  See application file for complete search history.

(56) References Cited

U.S. PATENT DOCUMENTS

| | | | |
|---|---|---|---|
| 2017/0318565 | A1* | 11/2017 | Golitschek Edler von Elbwart ... H04W 72/04 |
| 2018/0069653 | A1 | 3/2018 | Fujishiro et al. |
| 2018/0199314 | A1 | 7/2018 | Takeda et al. |
| 2018/0295642 | A1 | 10/2018 | Miao et al. |
| 2019/0200214 | A1 | 6/2019 | Liu et al. |
| 2019/0356424 | A1 | 11/2019 | Urabayashi et al. |
| 2020/0068546 | A1 | 2/2020 | Wu et al. |
| 2020/0229152 | A1 | 7/2020 | Park |

FOREIGN PATENT DOCUMENTS

| | | | | |
|---|---|---|---|---|
| CN | 108702262 | A | 10/2018 | |
| CN | 108810905 | A | 11/2018 | |
| CN | 109478990 | A | 3/2019 | |
| CN | 110035445 | A | 7/2019 | |
| WO | 2016/185945 | A1 | 11/2016 | |
| WO | WO 2017010477 | A1 | 1/2017 | |
| WO | WO-2017193399 | A1 * | 11/2017 | ........... H04L 5/0007 |
| WO | WO-2018004246 | A1 * | 1/2018 | ............... H04L 5/00 |
| WO | 2018/040779 | A1 | 3/2018 | |
| WO | WO-2018103750 | A1 * | 6/2018 | ............ H04W 72/04 |
| WO | 2018/127021 | A1 | 7/2018 | |
| WO | WO 2018143032 | A1 | 8/2018 | |
| WO | WO-2018182365 | A1 * | 10/2018 | ........... H04L 1/0003 |

OTHER PUBLICATIONS

3GPP TS 38.214 V15.4.0, "$3^{rd}$ Generation Partnership Project; Technical Specification Group Radio Access Network; NR; Physical layer procedures for data (Release 15)," Dec. 2018,103 pages.

Fujitsu, "Initial Slot with Flexible Starting Positions for NR-U," R1-1901939, Agenda Item: 7.2.2.1.2, 3GPP TSG RAN WG1 #96, Athens, Greece, Feb. 25-Mar. 1, 2019, 4 pages.

International Search Report, dated May 30, 2019, for International Application No. PCT/CN2019/080048, 2 pages.

NTT Docomo, Inc., "Revised WID on New Radio Access Technology," RP-181726, Agenda Item: 9.2.1, 3GPP TSG RAN Meeting #81, Gold Coast, Australia, Sep. 10-13, 2018, 14 pages.

Qualcomm Inc., "New WID on NR-based Access to Unlicensed Spectrum," RP-182878, Agenda Item: 9.1.1, 3GPP TSG RAN Meeting #82, Sorrento, Italy, Dec. 10-13, 2018, 8 pages.

Qualcomm Incorporated, "Feature lead summery on initial access signals and channels for NR-U," R1-1903404, Agenda Item: 7.2.2. 1.1, 3GPP TSG RAN WG1 Meeting #96, Athens, Greece, Feb. 25-Mar. 1, 2019, 33 pages.

CATT, "PDSCH and PUSCH resource allocation," R1-1715824, Agenda Item: 6.3.3.1, 3GPP TSG RAN WG1 Meeting AH_#NR3, Nagoya, Japan, Sep. 18-21, 2017, 11 pages.

CATT, "PDSCH and PUSCH resource allocation," R1-1717833, Agenda Item: 7.3.3.1, 3GPP TSG RAN WG1 Meeting 90bis, Prague, CZ, Oct. 9-13, 2017, 9 pages.

Extended European Search Report, dated Mar. 9, 2022, for European Application No. 19921049.3-1215, 13 pages.

English Translation of Chinese Search Report dated Dec. 1, 2023, for the corresponding Chinese Patent Application No. 2019800946245, 4 pages.

European Communication, dated Apr. 22, 2024, for European Patent Application No. 19 921 049.3-1215. (9 pages).

LG Electronics, "Physical layer design of DL signals and channels for NR-U," R1-1902038, Agenda Item: 7.2.2.1.2, 3GPP TSG RAN WG1 #96, Athens, Greece, Feb. 25-Mar. 1, 2019. (7 pages).

* cited by examiner

| Row Index | SLIV |
|---|---|
| 0 | 53 (S=2, L=12) |
| 1 | 91 (S=7, L=7) |
| 2 | 26 (S=12, L=2) |
| ... | ... |

FIG. 2

| Row Index | L of First Resource | L of Second Resource | S of Second Resource |
|---|---|---|---|
| 0 | 12 | 12 | 2 |
| 1 | 12 | 7 | 7 |
| 2 | 7 | 7 | 7 |
| 3 | 7 | 4 | 10 |
| ... | ... | ... | ... |

FIG. 12

| Row Index | L of First Resource | SLIV including L and S of Second Resource |
|---|---|---|
| 0 | 12 | 53 (L=12, S=2) |
| 1 | 12 | 91 (L=7, S=7) |
| 2 | 7 | 91 (S=7, L=7) |
| 3 | 7 | 52 (L=4, S=10) |
| ... | ... | ... |

FIG. 13

| Row Index | L of Second Resource | S of Second Resource |
|---|---|---|
| 0 | 12 | 2 |
| 1 | 7 | 7 |
| 2 | 7 | 7 |
| 3 | 4 | 10 |
| ... | ... | ... |

FIG. 14

| Row Index | SLIV including L and S of Second Resource |
|---|---|
| 0 | 53 (L=12, S=2) |
| 1 | 91 (L=7, S=7) |
| 2 | 91 (S=7, L=7) |
| 3 | 52 (L=4, S=10) |
| ... | ... |

FIG. 15

MOBILE STATION, BASE STATION, RECEPTION METHOD, AND TRANSMISSION METHOD

TECHNICAL FIELD

The present disclosure relates to a mobile station, a base station, a reception method, and a transmission method.

BACKGROUND ART

Studies have been carried out on communication systems so called 5$^{th}$ Generation mobile communication systems (5G). In the 3rd generation partnership project (3GPP), which is an international standardization organization, further advancement of 5G communication systems has been under study in both aspects of advancement of the LTE/LTE-Advanced systems and advancement of New Radio Access Technology (also referred to as "New RAT" or "NR") (e.g., see Non-Patent Literature (hereinafter, referred to as "NPL") 1) not necessarily having backward compatibility with the LTE/LTE-Advanced systems.

In NR, operation in a band that requires no license (unlicensed band) in addition to a band that requires a license (licensed band), as in License-Assisted Access (LAA) or Enhanced LAA (eLAA) of LTE has been discussed (e.g., see NPL 2). Operation in unlicensed bands is also called "NR-based Access to Unlicensed Spectrum" or "NR-U," for example.

CITATION LIST

Non-Patent Literature

NPL 1
RP-181726, "Revised WID on New Radio Access Technology," NTT DOCOMO, September 2018
NPL 2
RP-182878, "New WID on NR-based Access to Unlicensed Spectrum," Qualcomm, December 2018
NPL 3
3GPP TS 37.213 V15.1.0, "Physical layer procedure for shared spectrum channel access (Release 15)," September 2018
NPL 4
3GPP TS 38.214 V15.4.0, "NR; Physical layer procedures for data (Release 15)," December 2018
NPL 5
R1-1901939, "Initial Slot with Flexible Starting Positions for NR-U," Fujitsu, February 2019

SUMMARY

There have been no sufficient studies on data communication methods in unlicensed bands, however.

One non-limiting and exemplary embodiment of the present disclosure facilitates providing a mobile station, a base station, a reception method, and a transmission method each capable of appropriately performing data communication in unlicensed bands.

In one general aspect, the techniques disclosed here feature; a mobile station, including: reception circuitry, which, in operation, receives first information relating to a size configured for data, and second information relating to a resource to which the data is assigned; and control circuitry, which, in operation, controls reception of the data based on the first information and the second information.

It should be noted that general or specific embodiments may be implemented as a system, an apparatus, a method, an integrated circuit, a computer program or a storage medium, or any selective combination of the system, the apparatus, the method, the integrated circuit, the computer program, and the storage medium.

According to one exemplary embodiment of this disclosure, data communication can be appropriately performed in unlicensed bands.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 is a diagram illustrating an example of downlink data assignment;
FIG. 12 is a diagram illustrating an example of control information according to Operation Example 1-1 of Embodiment 1;
FIG. 13 is a diagram illustrating another example of the control information according to Operation Example 1-1 of Embodiment 1;
FIG. 14 is a diagram illustrating an example of control information according to Operation Example 1-2 of Embodiment 1;
FIG. 15 is a diagram illustrating another example of the control information according to Operation Example 1-2 of Embodiment 1.

DESCRIPTION OF EMBODIMENTS

Hereinafter, a detailed description will be given of embodiments of the present disclosure with reference to the accompanying drawings.

[Carrier Sense/Listen Before Talk (LBT)]

In unlicensed bands, for the purpose of preventing interference between radio devices, each radio device is required to perform carrier sense before transmission of a signal to confirm that no signal is transmitted in the same frequency band from a neighboring radio device.

In NR-U, use of carrier sense so called LBT category 4 (or Type 1 UL channel access procedure) and LBT category 2 (or Type 2 UL channel access procedure), for example, is expected as with eLAA (e.g., see NPL 3). In LBT category 2, a period during which carrier sense is performed (e.g., also called LBT duration) is fixed to 25 microseconds, for example. In LBT category 4, the period during which carrier sense is performed is, for example, 25 microseconds or longer, and may be randomly determined.

Hereinafter, the term "LBT" is used to mean career sense in NR-U.

Figure 1:
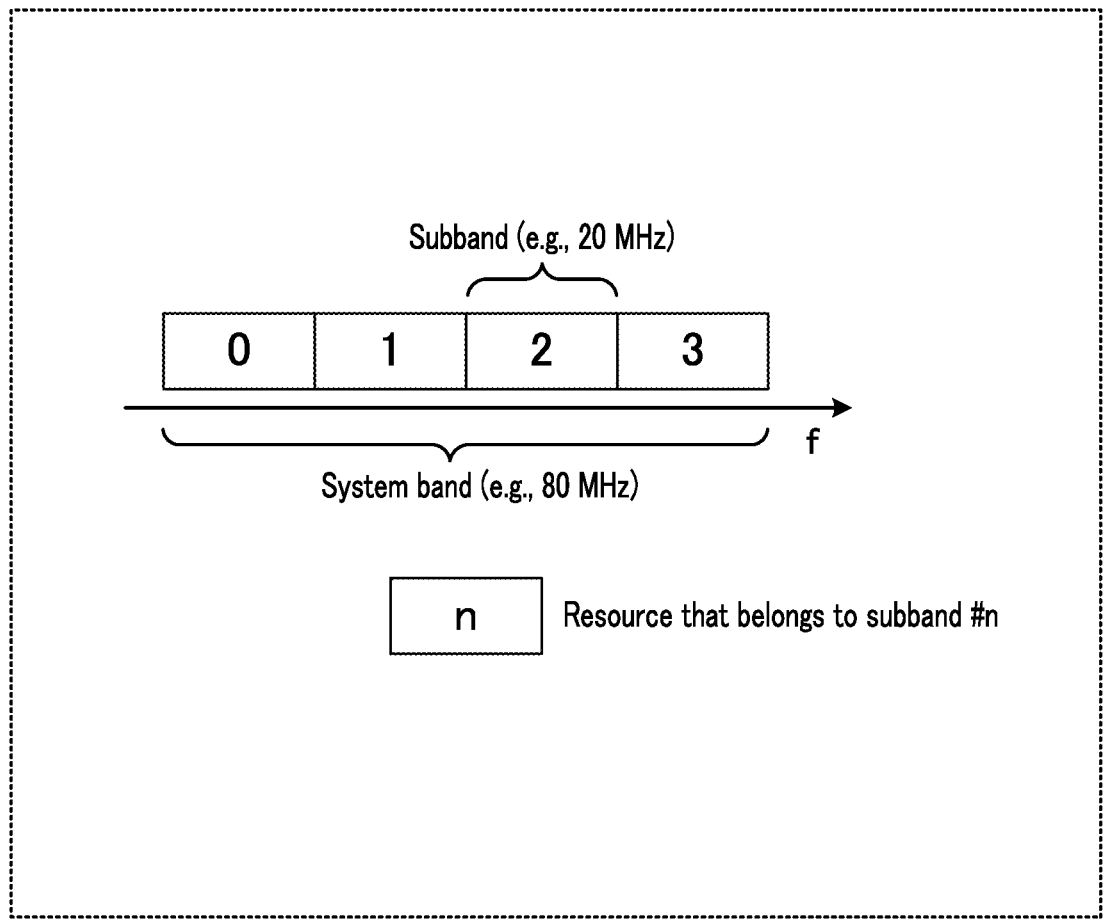
FIG. 1 is a diagram illustrating examples of subbands.

Moreover, in NR-U, for example, as illustrated in FIG. 1, a system band (e.g., 80 MHz) is divided into a plurality of bands (e.g., 20 MHz regions, and each region is called "subband" or "sub-band"), and LBT is performed in each subband. In this case, there may be an operation in which a signal is transmitted in a subband in which LBT is complete and no signal is transmitted in a subband in which LBT is not complete.

[Downlink Data Assignment (Time Domain)]

In NR, for example, a downlink data channel (e.g., Physical Downlink Shared Channel (PDSCH)) is used for downlink (DL) data transmission.

In Rel-15 NR, a symbol (e.g., Orthogonal Frequency Division Multiplexing (OFDM) symbol) which is a time resource forming a resource of each PDSCH (hereinafter, also referred to as "PDSCH resource") is indicated to a mobile station (e.g., also referred to as a "terminal" or "User Equipment" (UE)) from a base station (e.g., also referred to as "gNB") via a downlink control channel (e.g., Physical Downlink Control Channel (PDCCH)).

Figure 2:
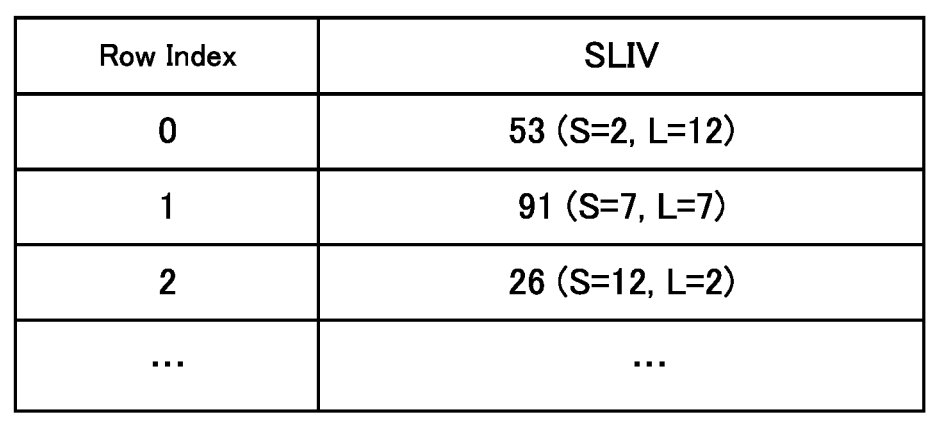

The symbol forming a PDSCH resource is indicated to a mobile station via "Time domain resource assignment" which is one field of downlink control information (e.g., Downlink Control Information (DCI)) transmitted via PDCCH, for example. This field, for example, corresponds to Row Index of a "pdsch-TimeDomainAllocationList table" as illustrated in FIG. 2. In FIG. 2, each Row Index is associated with a value which is "Start and Length Indicator Value (SLIV)." The association between Row Index and SLIV is configured in a mobile station by a higher layer, for example. The value of SLIV corresponds one-to one to a combination of two values of "S" which represents a PDSCH assignment starting symbol position in a slot and "L" which represents an assignment symbol length (i.e., the number of symbols) (see, e.g., NPL 4). The mobile station derives the values of S and L from the indicated value of SLIV, for example. An indication that PDSCH is assigned from an S-th symbol to an (S+L−1)-th symbol, for example, according to the values of "S" and "L" is given to the mobile station.

Figure 3:
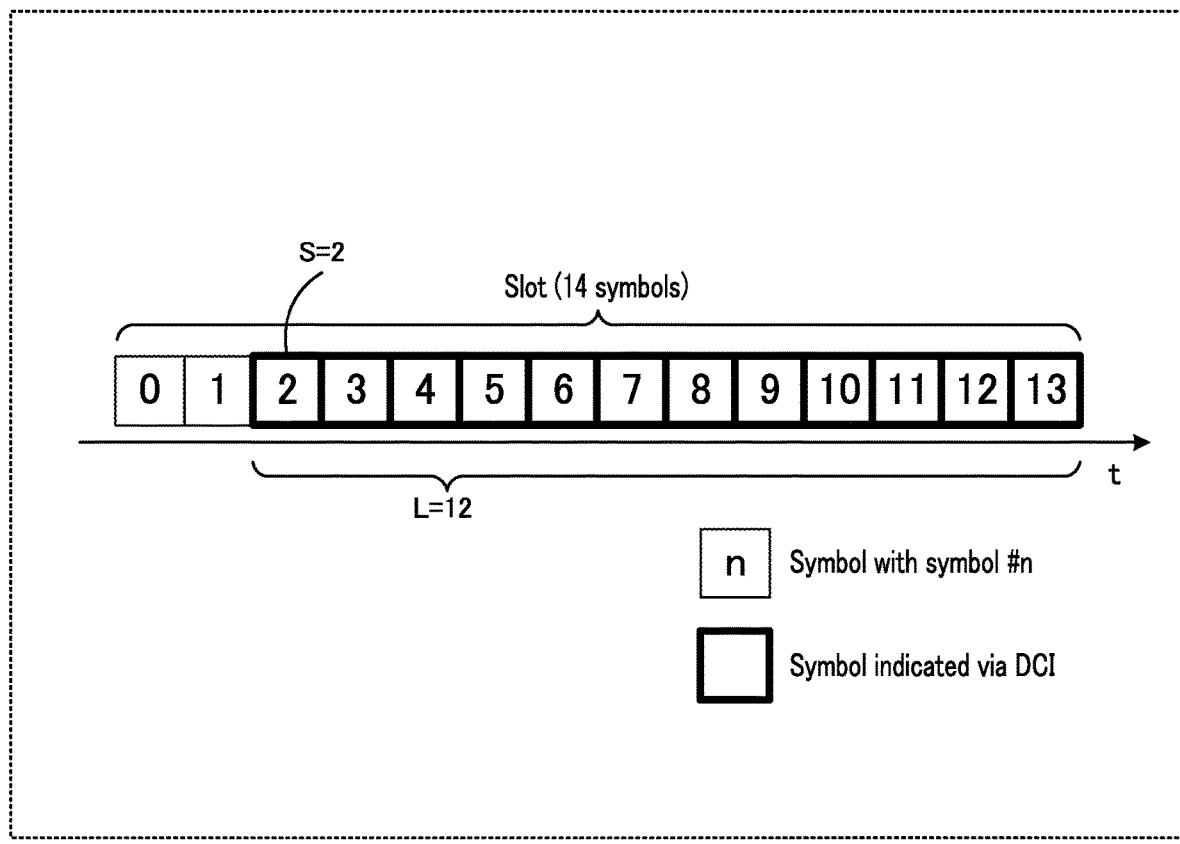
FIG. 3 is a diagram illustrating a configuration example of downlink data.

FIG. 3 illustrates a configuration example of PDSCH of a case where Row index=0 of FIG. 2 is indicated to a mobile station, as an example. As illustrated in FIG. 3, the mobile station determines that the symbols forming PDSCH are 12 symbols from the symbol (S=2nd symbol) to the symbol ((S+L−1)=13th symbol).

Figure 4:
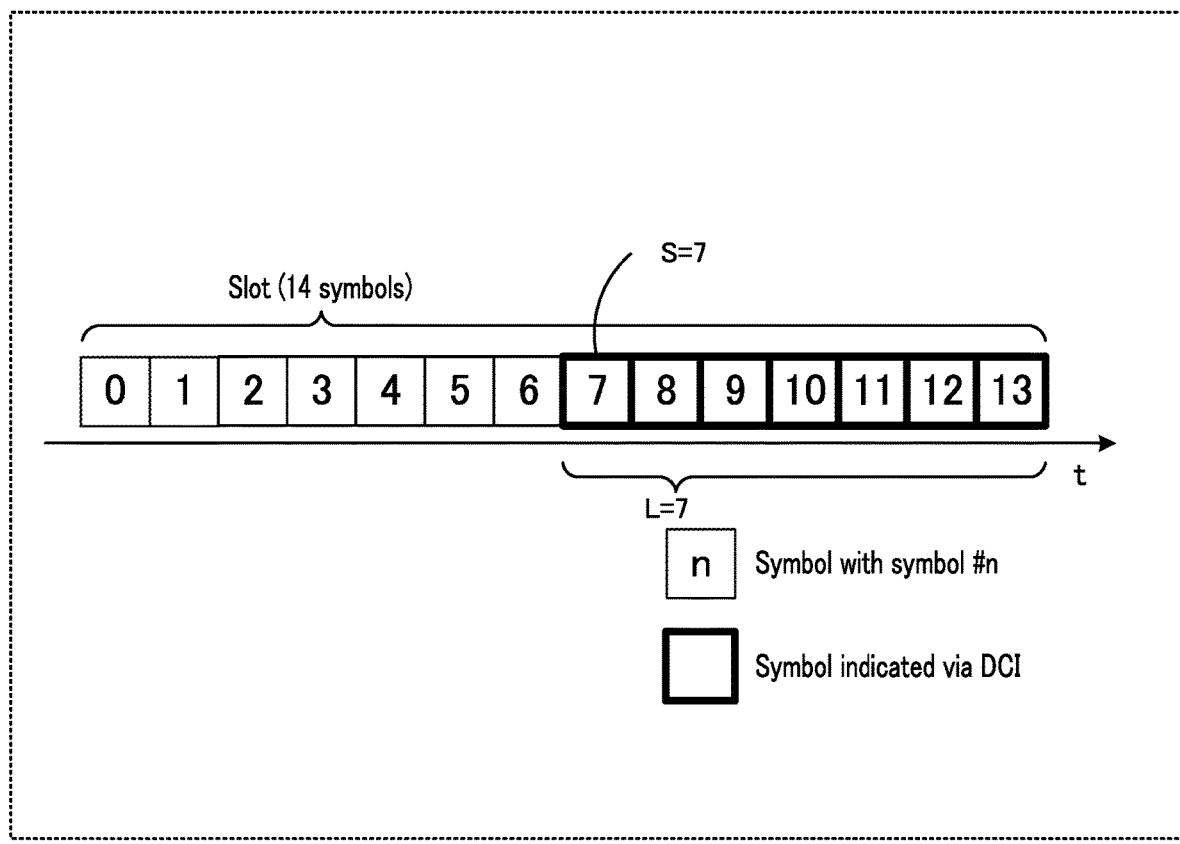
FIG. 4 is a diagram illustrating another configuration example of downlink data.

FIG. 4 illustrates a configuration example of PDSCH of a case where Row index=1 of FIG. 2 is indicated to a mobile station, as another example. As illustrated in FIG. 4, the mobile station determines that the symbols forming PDSCH are 7 symbols from the symbol (S=7th symbol) to the symbol ((S+L−1)=13th symbol).

In NR-U, the method indicating downlink data assignment in the time domain described above may also be applied.

[Downlink Data Assignment (Frequency Domain)]

In Rel-15 NR, a subcarrier which is a frequency resource forming each PDSCH resource, for example, is indicated to a mobile station via "Frequency domain resource assignment" which is one field of a DCI transmitted via PDCCH.

In NR-U, a method of indicating which subband is to be used by a mobile station, in addition to this information indicating a subcarrier, has been also discussed.

A description will be given of a case where a system band is formed of four subbands, for example. In this case, for example, a bit map of 4 bits each indicating the availability of a corresponding subband may be indicated to a mobile station. The bit map of 4 bits may be indicated to the mobile station while a subband to be used by the mobile station is set to "1" and a subband not to be used by the mobile station is set to "0" in the bit map of 4 bits, for example. In a case where a bit map indicating "1110" is indicated to a mobile station from a base station, the mobile station may determine to use three subbands with subband #0 to #2 each indicated as "1" in the bit map and not to use one subband with subband #3 indicated as "0" in the bit map, as an example.

[Downlink Data Transmission Processing]

A base station determines a PDSCH resource (e.g., at least one of a time resource and a frequency resource) based on, for example, a size of a transport block (TB) including downlink data (also referred to as "TB size" or "TBS") and a combination of an applicable modulation order and coding rate (e.g., Modulation and Coding Scheme (MCS)). The base station indicates the determined PDSCH resource to the mobile station via a DCI, for example.

Moreover, the base station, for example, applies coding on a TB including downlink data and adjusts the number of bits such that the data signal resulting from the coding matches the size of the PDSCH resource described above. This processing of adjusting the number of bits is also referred to as "rate-matching." The base station assigns the data signal that has been subjected to the rate-matching (hereinafter, may be referred to as a "rate-matching output signal") to a PDSCH resource and transmits the data signal with a DCI to the mobile station.

The mobile station reads the PDSCH resource from the received DCI. Moreover, the mobile station derives the size of the TB (TB size) received in PDSCH based on the size of the read PDSCH resource (e.g., see NPL 4). The mobile station further determines how rate-matching has been applied to the downlink data in the base station, based on the derived TB size. Thus, the mobile station can appropriately decode the downlink data.

A description of the downlink data transmission processing has been given thus far.

In NR-U, an assumption is made herein that a base station performs LBT before transmission of downlink data (e.g., also referred to as a PDSCH signal), for example. The base station, for example, starts transmission of the downlink data after completion of LBT (i.e., LBT succeeds).

For this reason, there may be a case where the size of the PDSCH resource determined by the base station based on the TB size (hereafter, referred to as "the first resource") and the size of an available PDSCH resource after completion of LBT (i.e., actually allocated PDSCH resource (hereinafter, may be referred to as "the second resource")) are different.

In a case where a size of the second resource (hereinafter, may be referred to as "second resource size") is smaller than a size of the first resource (hereinafter, may be referred to as "first resource size"), the number of bits of a rate-matching output signal is greater than the number of bits that are transmittable using the second resource. In this respect, a method for making adjustment has been discussed in which the base station further deletes (i.e., punctures) a part of the bits of the rate-matching output signal such that the number of bits of the rate-matching output signal matches the second resource size (e.g., see NPL 5). This processing of adjusting the number of bits may be performed separately from the rate-matching described above, for example.

Further, for example, in a case where the second resource size is larger than the first resource size, the number of bits of a rate-matching output signal is less than the number of bits that are transmittable using the second resource. In this respect, a method for making adjustment may be employed in which the base station repeats (i.e., performs repetition) part of the bits of the rate-matching output signal such that the number of bits of the rate-matching output signal matches the second resource size. This processing of adjusting the number of bits may be performed separately from the rate-matching described above, for example.

In a case where the size (e.g., the number of bits) of the rate-matching output signal in accordance with the second resource size, there is a possibility that the mobile station cannot correctly estimate (or derive) the TB size of the downlink data unless an indication on the first resource is given although the second resource is indicated, for example. For this reason, there is a possibility that the mobile station cannot appropriately decode the downlink data. Meanwhile, in a case where the size of a rate-matching output signal is adjusted in accordance with the second resource size, there is a possibility that the mobile station cannot determine the resource to which PDSCH is actually mapped, unless an indication on the second resource is given although the first resource is indicated, for example.

Figure 5:
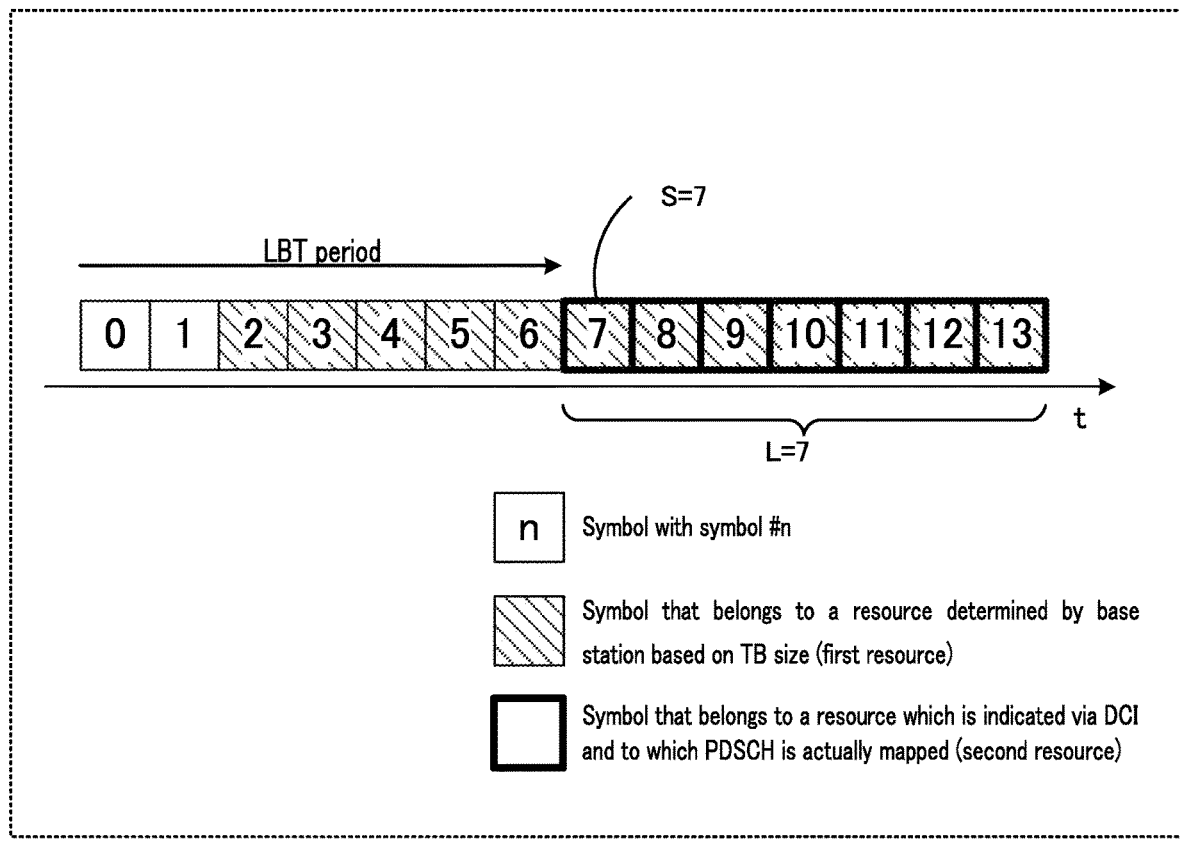
FIG. 5 is a diagram illustrating a configuration example of downlink data during performing of LBT.

FIG. 5 illustrates an example of a case where the first resource and the second resource are different from each other in the time domain.

As illustrated in FIG. 5, for example, the base station determines the 12 symbols from the 2nd symbol to the 13th symbol to be the first resource based on the TB size and performs rate-matching based on the determined first resource. Moreover, as illustrated in FIG. 5, the base station may perform LBT and complete LBT before the 7th symbol, and then determine 7 symbols from the 7th symbol to the 13th symbol to be the second resource available for mapping of PDSCH.

At this time, as illustrated in FIG. 5, the second resource size (e.g., 7 symbols) is smaller than the first resource size (e.g., 12 symbols). Thus, the base station deletes a part of the bits (e.g., 5 symbols from the 2nd symbol to the 6th symbol) of the rate-matching output signal to make adjustment such that the rate-matching output signal matches the the second resource size. Thus, the signal resulting from the adjustment (e.g., 7 symbols from the 7th symbol to the 13th symbol) may be mapped to the second resource. In order to indicate the mapping of PDSCH in the second resource to the mobile station, the base station may indicate a DCI including the information (e.g., such as SLIV) corresponding to S=7 and L=7, for example.

In this case, the information (e.g., S=7 and L=7) relating to the second resource is indicated to the mobile station via a DCI whereas the information indicating the first resource is not indicated. For this reason, the mobile station cannot derive the TB size and cannot determine how rate-matching has been applied to the downlink data signal in the base station. For this reason, there may be a case where the mobile station cannot appropriately decode the downlink data.

Figure 6:
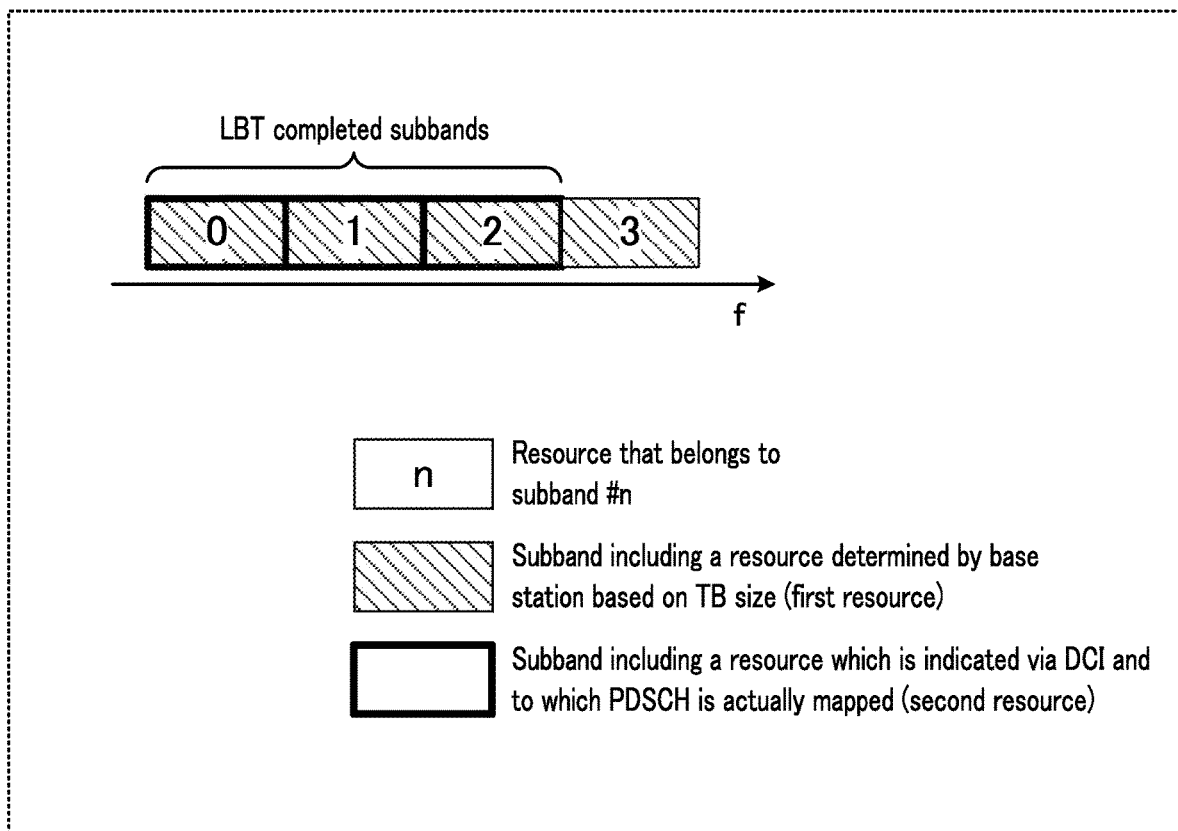
FIG. 6 is a diagram illustrating an assignment example of subbands during performing of LBT.

Next, FIG. 6 illustrates a case where the first resource and the second resource are different from each other in the frequency domain.

As illustrated in FIG. 6, for example, the base station may determine the first resource over the 0th to the 3rd subbands based on the TB size and perform rate-matching based on the determined first resource. Moreover, as illustrated in FIG. 6, the base station performs LBT and completes the LBT from the 0th to the 3rd subbands and then determines that the second resource is available for mapping of PDSCH in these three subbands. In other words, the 3rd subband illustrated in FIG. 6 is determined to be unavailable for mapping of PDSCH.

At this time, as illustrated in FIG. 6, the second resource size (e.g., 3 subbands) is smaller than the first resource size (e.g., 4 subbands). Thus, the base station deletes a part of the bits (e.g., the signal of the 3rd subband in FIG. 6) of the rate-matching output signal to make adjustment such that the rate-matching output signal matches the second resource size. Thus, the signal resulting from the adjustment may be mapped to the second resource. The base station may indicate a DCI including the information indicating mapping of PDSCH in the second resource (e.g., from the 0th to the 2nd subband) to the mobile station.

In this case, the information relating to the second resource is indicated to the mobile station whereas the information relating to the first resource is not indicated to the mobile station. For this reason, the mobile station cannot derive the TB size and cannot determine how rate-matching has been applied to the downlink data signal in the base station. For this reason, there may be a case where the mobile station cannot appropriately decode the downlink data.

As described above, in NR-U, regarding transmission of downlink data, there may be a case where the first resource determined based on the TB size of the data and the second resource to which the data is actually assigned after completion of LBT are different from each other due to the impact of LBT. In other words, in NR-U, there may be a case where the first resource configured before performing LBT and the second resource configured after performing LBT are different from each other.

In this case, there is a possibility that the mobile station cannot appropriately perform reception processing (e.g., such as data extraction processing or data decoding processing) on the downlink data although any one of the information relating to the first resource and the information relating to the second resource is indicated to the mobile station.

In this respect, in one exemplary embodiment of the present disclosure below, a description will be given of a method of indicating, from a base station to a mobile station, the information relating to a TB size of downlink data (i.e., the first resource) (hereinafter, referred to as "first information") and the information relating to the second resource to which downlink data is assigned (hereinafter, referred to as "second information"). The first information is information determined before performing LBT and includes information relating to a resource amount of downlink data before performing LBT (e.g., resource amount corresponding to TB size), for example. Further, the second information is information determined based on a result of LBT and includes information relating to an allocation resource for downlink data after performing LBT, for example.

Embodiment 1

In this embodiment, transmission of downlink data relating to the time domain of NR-U in unlicensed bands will be described. In other words, in this embodiment, the first resource is a time resource determined based on a TB size configured for downlink data and the second resource is a time resource allocated for the downlink data.

[Overview of Communication System]

A communication system according to the present embodiment includes base station 100 and mobile station 200.

Figure 7:
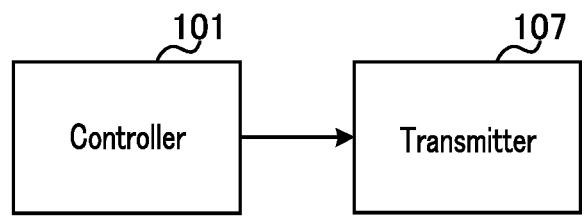
FIG. 7 is a block diagram illustrating a configuration example of a part of a base station according to Embodiment 1.

FIG. 7 is a block diagram illustrating a configuration of a part of base station 100 according to Embodiment 1. In base station 100 illustrated in FIG. 7, transmitter 107 (corresponding to transmission circuitry) transmits first information relating to a size (e.g., TB size) configured for data and second information relating to a resource to which data is assigned (e.g., second resource). Controller 101 (corresponding to control circuitry) controls transmission of the data based on the first information and the second information.

Figure 8:
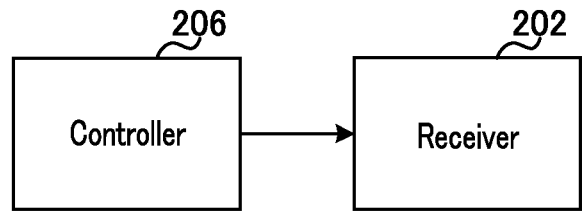
FIG. 8 is a block diagram illustrating a configuration example of a part of a mobile station according to Embodiment 1.

FIG. 8 is a block diagram illustrating a configuration example of a part of mobile station 200 according to the present embodiment. In mobile station 200 illustrated in FIG. 8, receiver 202 (corresponding to reception circuitry) receives first information relating to a size (e.g., TB size) configured for data and second information relating to a resource to which data is assigned (e.g., second resource). Controller 206 (corresponding to control circuitry) controls reception of the data based on the first information and the second information.

[Configuration of Base Station]

Figure 9:
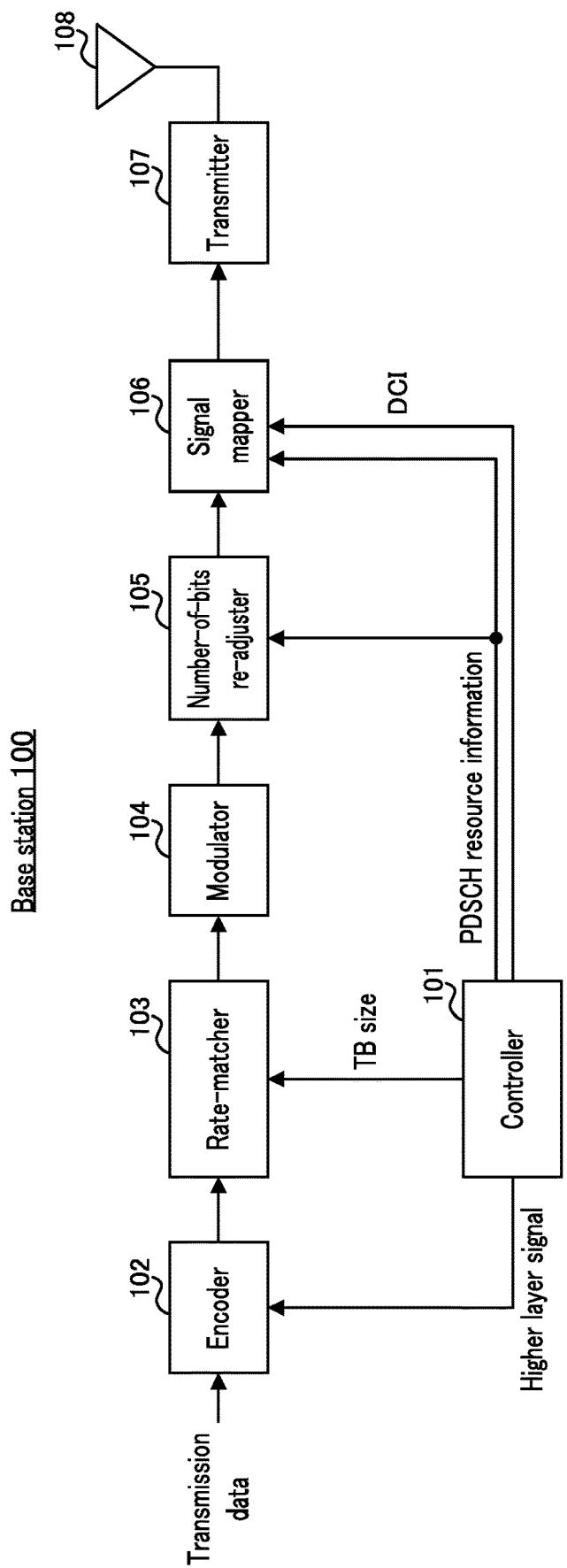
FIG. 9 is a block diagram illustrating a configuration example of the base station according to Embodiment 1.

FIG. 9 is a block diagram illustrating a configuration example of base station 100 according to the present embodiment. In FIG. 9, base station 100 includes controller 101, encoder 102, rate-matcher 103, modulator 104, number-of-bits re-adjuster 105, signal mapper 106, transmitter 107, and antenna 108.

Controller 101, for example, controls transmission of transmission data (i.e., downlink data). Controller 101, for example, determines a TB size of the transmission data and outputs information indicating the determined TB size (e.g., referred to as "TB size information") to rate-matcher 103. Further, controller 101 determines a PDSCH resource (i.e., first resource) based on the TB size. Controller 101, for example, determines also a PDSCH resource actually available after completion of LBT (i.e., second resource). Controller 101 generates information relating to the PDSCH resource determined based on the TB size (e.g., first information) and information relating to the PDSCH resource determined after completion of LBT (e.g., second information) and includes the information in at least one of a DCI and a higher layer signal. Controller 101 outputs the higher layer signal to encoder 102 and outputs the DCI to signal mapper 106. Moreover, controller 101 outputs PDSCH resource information indicating the PDSCH resource (i.e., second resource) to number-of-bits re-adjuster 105 and signal mapper 106.

Encoder 102 applies error correction coding to transmission data (i.e., PDSCH signal or downlink data) and the higher layer signal inputted from controller 101 and outputs the signal resulting from the error correction coding to rate matcher 103.

Rate matcher 103 applies rate matching to the signal inputted from encoder 102, based on TB size information inputted from controller 101, and outputs the signal resulting from the rate matching to modulator 104.

Modulator 104 modulates the signal inputted from rate matcher 103 and outputs the signal resulting from the modulation to number-of-bits re-adjuster 105.

Number-of-bits re-adjuster 105 adjusts the number of bits of the signal inputted from modulator 104, based on the PDSCH resource information (i.e., information relating to the second resource) inputted from controller 101, such that the number of bits of the signal matches the second resource size. Number-of-bits re-adjuster 105 then outputs the signal resulting from the adjustment for the number of bits to signal mapper 106.

Signal mapper 106 maps a DCI inputted from controller 101 to, for example, a PDCCH resource. Moreover, signal mapper 106 maps the signal inputted from number-of-bits re-adjuster 105 to a PDSCH resource (i.e., the second resource) based on the PDSCH resource information inputted from controller 101. Signal mapper 106 outputs the signal mapped to the resource to transmitter 107.

Transmitter 107 applies radio transmission processing, such as frequency conversion using a carrier wave, to the signal inputted from signal mapper 106, and outputs the signal resulting from the radio transmission processing to antenna 108.

Antenna 108 radiates the signal inputted from transmitter 107 (i.e., downlink signal) to mobile station 200.

[Configuration of Mobile Station]

Figure 10:
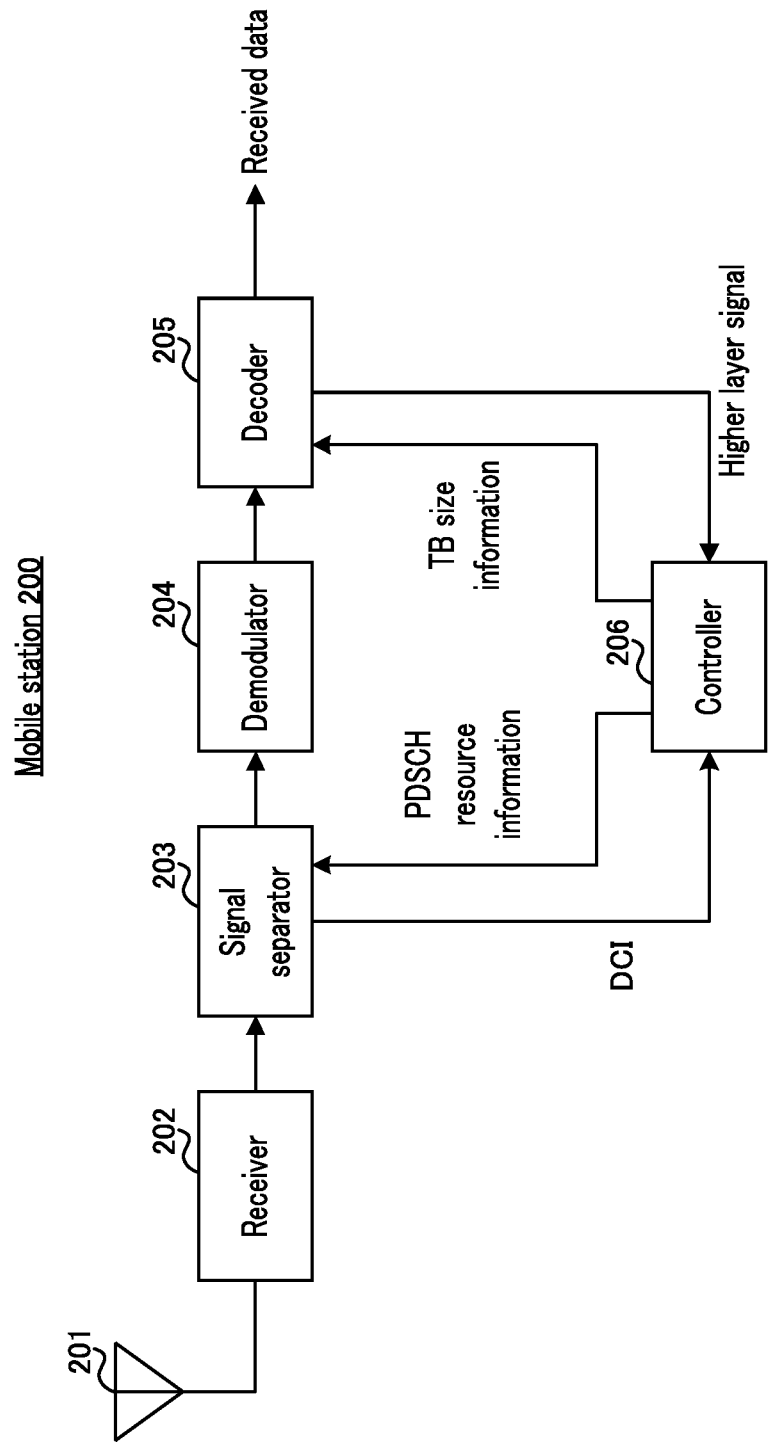
FIG. 10 is a block diagram illustrating a configuration example of the mobile station according to Embodiment 1.

FIG. 10 is a block diagram illustrating a configuration example of mobile station 200 according to the present embodiment. In FIG. 10, mobile station 200 includes antenna 201, receiver 202, signal separator 203, demodulator 204, decoder 205, and controller 206.

Antenna 201 receives a downlink signal transmitted from base station 100 (e.g., see FIG. 9) and outputs the downlink signal to receiver 202.

Receiver 202 applies radio reception processing, such as frequency conversion, to the signal inputted from antenna 201, and outputs the signal resulting from the radio reception processing to signal separator 203.

Signal separator 203 extracts from the signal inputted from receiver 202, for example, a DCI mapped to a PDCCH resource from the signal inputted from receiver 202 and outputs the DCI to controller 206. Moreover, signal separator 203 extracts a data signal mapped to a PDSCH resource, based on PDSCH resource information indicating the PDSCH resource (i.e., the second resource), which is inputted from controller 206, and outputs the extracted data signal to demodulator 204.

Demodulator 204 demodulates the data signal inputted from signal separator 203. Demodulator 204 outputs the signal resulting from the demodulation to decoder 205.

Decoder 205 decodes the signal inputted from demodulator 204, based on TB size information inputted from controller 206, and acquires a received data signal and a higher layer signal. Decoder 205 outputs the higher layer signal to controller 206.

Controller 206 acquires the information relating to the first resource and the second resource based on at least one of the DCI inputted from signal separator 203 and the higher layer signal inputted from decoder 205. Further, controller 206 outputs the information relating to the second resource (e.g., PDSCH resource information) to signal separator 203. Moreover, controller 206 determines (i.e., finds out) the TB size of the received data based on the information relating to the first resource and outputs TB size information indicating the TB size to decoder 205.

[Operation Examples of Base Station 100 and Mobile Station 200]

Next, a description will be given of operation examples of base station 100 (see FIG. 9) and mobile station 200 (see FIG. 10).

Hereinafter, a description will be given of Operation Examples 1-1 to 1-4 relating to indication of "first information" relating to a TB size configured for downlink data (or relating to first resource determined based on the TB size) and "second information" relating to a second resource (e.g., PDSCH resource) actually allocated for the downlink data after completion of LBT.

Operation Example 1-1

In Operation Example 1-1, the first information and the second information are indicated to mobile station 200 by a single parameter. Note that, the single parameter, for example, may be indicated in one DCI (i.e., one control signal) and may be indicated in one field within a DCI.

Figure 11:
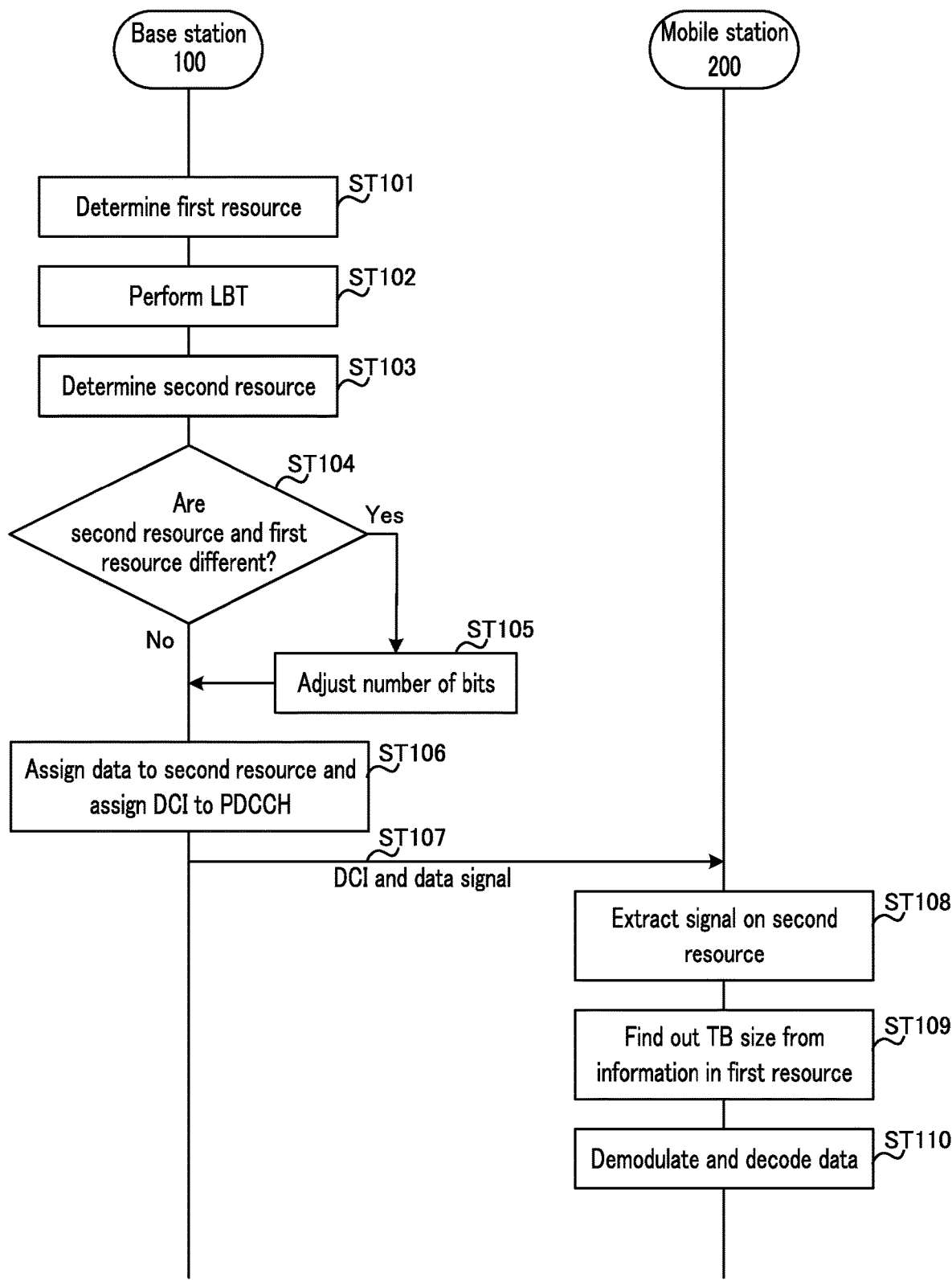
FIG. 11 is a sequence diagram illustrating an example of processing of the base station and mobile station, according to Operation Example 1-1 of Embodiment 1.

FIG. 11 is a sequence diagram illustrating an example of processing of base station 100 and mobile station 200 according to Operation Example 1-1.

In FIG. 11, base station 100, for example, determines a TB size and MCS of a data signal and determines the first resource (e.g., time resource) based on the TB size and MCS (ST101). In the example illustrated in FIG. 5, base station 100 determines the first resource formed of 12 symbols, for example. Moreover, base station 100 performs error correction coding and rate-matching and/or the like on the data signal based on the first resource (e.g., the number of symbols of the first resource).

Base station 100 performs LBT before transmitting a data signal (ST102). Upon completion of LBT, base station 100 determines the second resource (e.g., time resource) available for transmission of the data signal at the time of completion of LBT (ST103). In the example illustrated in FIG. 5, for example, base station 100 determines the second resource formed of 7 symbols starting from the 7th symbol within a slot.

In FIG. 11, base station 100 determines whether or not the first resource and the second resource are different from each other (ST104). In a case where the first resource and the second resource are different from each other (ST104: Yes), base station 100 adjusts the number of bits of the data signal (i.e., rate-matching output signal) such that the number of bits of the data signal matches the second resource size (i.e., the resource amount) (ST105). Meanwhile, in a case where the first resource and the second resource are not different from each other (ST104: No), base station 100 performs processing of ST106 without adjusting the number of bits of the data signal.

In the example illustrated in FIG. 5, the first resource (12 symbols) and the second resource (7 symbols) are different from each other. Thus, base station 100, for example, may delete (i.e., puncture) part of the data signal (e.g., the signal generated in ST101) to adjust the data signal to be the number of bits that can be mapped to the second resource (7 symbols in FIG. 5).

Note that, base station 100 may adjust the number of bits of a data signal not only in a case where the second resource is smaller than the first resource (i.e., in a case where a data signal is partly deleted) as illustrated in FIG. 5, but also in a case where the second resource is larger than the first resource. In a case where the first resource includes 7 symbols and the second resource includes 12 symbols (not illustrated), for example, base station 100 may adjust the number of bits of the data signal by repeating a part of bits of the data signal (i.e., by repetition) such that the data signal is fittingly mapped to 12 symbols. Note that, examples of the cases where the second resource is larger than the first resource include a case where although base station 100 has determined the first resource by assuming an LBT period, LBT has been completed within a time shorter than the assumed LBT period.

In FIG. 11, base station 100, for example, assigns a data signal to the second resource and assigns a DCI to a PDCCH resource (ST106). Note that, the first information relating to the first resource and the second information relating to the second resource are included in a DCI, for example. Base station 100 transmits the downlink signal including the data signal and DCI to mobile station 200 (ST108).

FIG. 12 illustrates examples of the first information and the second information included in a DCI, according to Operation Example 1-1.

In FIG. 12, for example, a plurality of candidates for a combination of the following parameters are configured: a parameter "L" indicating a length (also referred to as "size" or "resource amount," e.g., the number of symbols forming the first resource) of the first resource; a parameter "L" indicating a length (also referred to as "size" or "resource amount," e.g., the number of symbols forming the second resource) of the second resource; and a parameter "S" indicating a starting position (e.g., the first symbol position for mapping the second resource) of the second resource.

In FIG. 12, the first information indicates "L of the first resource" representing the resource amount of the first resource. Moreover, in FIG. 12, the second information indicates "L of the second resource" representing the resource amount of the second resource and also indicates "S of the second resource" representing a position of the second resource.

Moreover, in FIG. 12, candidates for a combination of L of the first resource, L of the second resource and S of the second resource are each associated with Row Index (identification information). Base station 100 and mobile station 200, for example, share the association between Row Index illustrated in FIG. 12 and each combination of the parameters. The association between Row Index illustrated in FIG. 12 and each combination of the parameters may be indicated from base station 100 to mobile station 200 via a higher layer signal or a DCI, and/or may be specified in a standard, for example Base station 100 indicates, to mobile station 200, a DCI including Row Index indicating any one of a plurality of candidates for the combination of the first information (L of the first resource) and the second information (L and S of the second resource). As an example, in FIG. 12, in a case where the first resource includes 12 symbols and the second resource includes 7 symbols starting from the 7th symbol of a slot, base station 100 indicates a DCI including Row Index=1 to the mobile station 200.

In FIG. 11, mobile station 200 extracts a data signal assigned to the second resource, based on the second information included in the DCI received from base station 100 (ST108). In a case where Row Index=1 (e.g., L=12 of the second resource and S=7 of the second resource) is indicated by a DCI, mobile station 200 may determine that the second resource includes 7 symbols starting from the 7th symbol within a slot and extract a data signal in the 7 symbols corresponding to the second resource.

Moreover, mobile station 200 identifies (i.e., finds out) the TB size of the data signal based on the first information included in the DCI received from base station 100 (ST109). In FIG. 12, for example, in a case where Row Index=1 (e.g., L=12 of the first resource) is indicated by the DCI, mobile station 200 determines that the first resource includes 12 symbols, and computes a TB size corresponding to 12 symbols (see, e.g., NPL 4).

Mobile station 200 demodulates and decodes the extracted data signal based on the computed TB size (ST110).

An example of a data transmission and reception method in base station 100 and mobile station 200, according to Operation Example 1-1, has been described thus far.

According to Operation Example 1-1, even in a case where the first resource and the second resource are different from each other, mobile station 200 can identify the allocation resource for the data signal and the TB size configured for the data signal and thus can appropriately perform reception processing (e.g., data extraction and decoding) on the data signal.

Moreover, according to Operation Example 1-1, base station 100 can indicate the first information and the second information to mobile station 200 with a single parameter (e.g., Row Index illustrated in FIG. 12). Thus, the overhead for DCIs can be reduced.

Note that, although the case has been described where L of the second resource and S of the second resource are configured as different parameters (i.e., different columns of the table illustrated in FIG. 12) in FIG. 12, it is not limited to this case. As illustrated in FIG. 13, for example, L of the second resource and S of the second resource may be configured by SLIV as in FIG. 2. With the method illustrated in FIG. 13, mobile station 200 can appropriately decode the data signal based on the information on the TB size (i.e., the first resource) and allocation resource (i.e., the second resource) for the data signal. Moreover, in FIG. 13, the overhead for higher layer signals can be reduced because the number of parameters is small as compared with FIG. 12.

Further, although the case has been described where L of the second resource and S of the second resource are configured in SLIV in FIG. 13, it is not limited to this case. L of the first resource and S of the second resource may be configured in SLIV, and L of the second resource may be configured with an individual value, for example. In this case as well, mobile station 200 can appropriately decode a data signal based on the information on a TB size (i.e., the first resource) and allocation resource (i.e., the second resource) for the data signal. Moreover, in this case as well, the overhead for higher layer signals can be reduced because the number of parameters is small as compared with FIG. 12.

Operation Example 1-2

In Operation Example 1-1, the case has been described where the first information and the second information are indicated with a single parameter. Meanwhile, in Operation Example 1-2, the first information and second information are indicated with different parameters, respectively. Note that, the parameters indicating the first information and the second information may be indicated respectively in different DCIs (i.e., different control signals), and may be indicated respectively in different fields within one DCI.

Note that, the processing of base station 100 and mobile station 200 in Operation Example 1-2 is the same as the processing in Operation Example 1-1 (e.g., see FIG. 11), and the information relating to the first resource and the second resource included in a DCI (i.e., DCI configuration) is different.

The first information is included in a first DCI (or may be referred to as "first DCI field") and the second information is included in a second DCI (or may be referred to as "second DCI field") which is different from the first DCI, for example.

Further, the first DCI at least includes a parameter "L" which represents a length of the first resource (e.g., the number of symbols forming the first resource), for example.

Further, the second DCI includes at least a parameter "L" which represents a length of the second resource (e.g., the number of symbols forming the second resource) and a parameter "S" indicating a starting position of the second resource (e.g., the first symbol position for mapping the second resource), for example.

FIG. 14 illustrates an example of the second information included in the second DCI, according to Operation Example 1-2.

In FIG. 14, a plurality of candidates for a combination of L of the second resource and S of the second resource are configured, for example.

Further, in FIG. 14, candidates for a combination of L of the second resource and S of the second resource are each associated with Row Index. Base station 100 and mobile station 200, for example, share the association between Row Index illustrated in FIG. 14 and each combination of the parameters. The association between Row Index illustrated in FIG. 12 and each combination of the parameters may be indicated from base station 100 to mobile station 200 via a higher layer signal or a DCI, and/or may be specified in a standard, for example.

Base station 100 indicates each of a first DCI including the first information (e.g., L of the first resource) and a second DCI including the second information (e.g., L and S of the second resource) to mobile station 200. As an example, in a case where the first resource includes 12 symbols and the second resource includes 7 symbols starting from the 7th symbol of a slot, base station 100 indicates the first DCI including L=12 and the second DCI including Row Index=1 illustrated in FIG. 14 to the mobile station 200.

According to Operation Example 1-2, as in Operation Example 1-1, even in a case where the first resource and the second resource are different from each other, mobile station 200 can identify the allocation resource for the data signal and the TB size configured for the data signal and thus can appropriately perform reception processing (e.g., data extraction and decoding) on the data signal.

Moreover, according to Operation Example 1-2, base station 100 can independently indicate the first information and the second information to mobile station 200. Thus, base station 100 can more flexibly configure each of the first resource (i.e., TB size) and the second resource.

Note that, although the case has been described where L of the second resource and S of the second resource are configured as different parameters (i.e., different columns of the table illustrated in FIG. 14) in FIG. 14, it is not limited to this case. As illustrated in FIG. 15, for example, L of the second resource and S of the second resource may be configured by SLIV as in FIG. 2 and indicated. With the method illustrated in FIG. 15 as well, mobile station 200 can appropriately decode a data signal based on the information on a TB size (i.e., the first resource) and allocation resource (i.e., the second resource) for the data signal. Moreover, in FIG. 15, the overhead for higher layer signals can be reduced because the number of parameters is small as compared with FIG. 14.

Moreover, although the case has been described where L of the second resource and S of the second resource are indicated by a single DCI (or single DCI field) in FIG. 14, it is not limited to this case. L of the first resource, L of the second resource, and S of the second resource may be indicated respectively in different DCIs (or DCI fields), for example. Further, base station 100 may combine L of the first resource and S of the second resource as in FIG. 14 or FIG. 15 and indicate the L of the first resource and S of the second resource to mobile station 200 via a single DCI (e.g., single DCI including Row Index) and indicate L of the second resource to mobile station 200 via another DCI. With this method as well, mobile station 200 can appropriately decode a data signal based on the information on a TB size and allocation resource.

Operation Example 1-3

In Operation Example 1-3, any one of the first information and the second information is indicated to mobile station 200 via a higher layer signal and the other information is indicated via a DCI.

Figure 16:
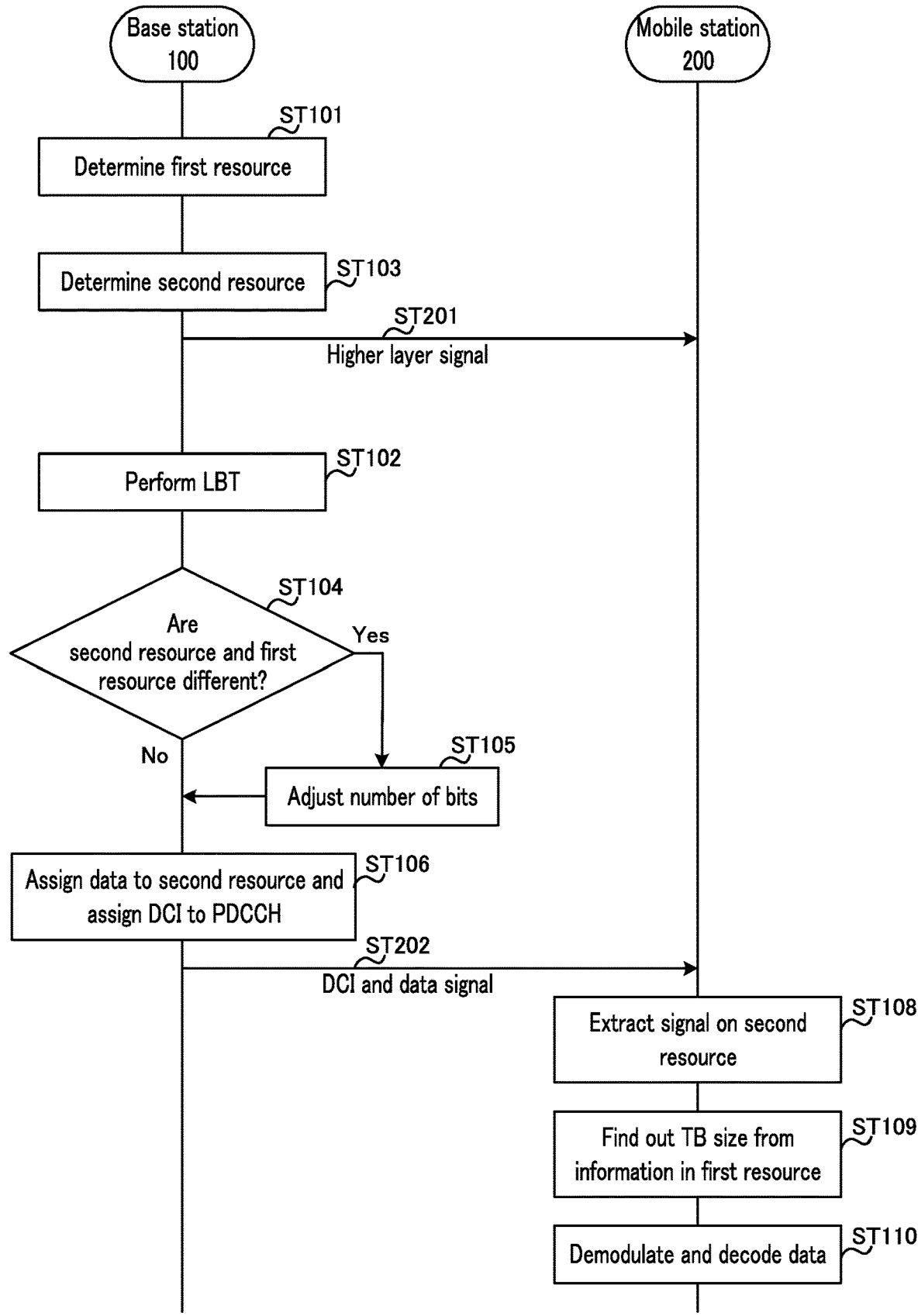
FIG. 16 is a sequence diagram illustrating an example of processing of the base station and mobile station, according to Operation Example 1-3 of Embodiment 1.

FIG. 16 is a sequence diagram illustrating an example of processing of base station 100 and mobile station 200 according to Operation Example 1-3. Note that, in FIG. 16, the processing which is identical to the processing in Operation Example 1-1 (e.g., FIG. 11) is assigned the same reference numeral, and the description of the processing will not be repeated, herein.

In FIG. 16, base station 100 may determine the second resource (ST103) before performing LBT (ST102).

Base station 100 indicates, to mobile station 200, a higher layer signal including any one of the first information relating to the first resource and the second information relating to the second resource (ST201). Further, base station 100 indicates a DCI including the other one of the first information and the second information to mobile station 200 (ST202).

In a case where the first information is indicated to mobile station 200 via a higher layer signal, for example, base station 100 may determine the second resource after performing LBT of ST102 as in FIG. 11 and indicate a DCI including the second information relating to the determined second resource to mobile station 200.

Mobile station 200 derives the first resource (or TB size) and the second resource based on the first information and the second information indicated from base station 100 via the higher layer signal and the DCI. Further, mobile station 200 performs data reception processing (e.g., data extraction and decoding) based on the first resource and the second resource as in Operation Example 1-1.

According to Operation Example 1-3, as in Operation Example 1-1, even in a case where the first resource and the second resource are different from each other, mobile station 200 can identify the allocation resource for the data signal and the TB size configured for the data signal and thus can appropriately perform reception processing (e.g., data extraction and decoding) on the data signal.

According to Operation Example 1-3, the overhead for DCIs can be reduced because any one of the first information and the second information is indicated to mobile station 200 via a higher layer signal Note that, both of the first information and the second information may be indicated to mobile station 200 via a higher layer signal. In this case, indication via a DCI is no longer required, so that signaling can be reduced.

Further, at least one of the first information and the second information may be a fixed value. The fixed value is shared between base station 100 and mobile station 200, for example. In this case, indication of any one of the first information and the second information becomes unnecessary, so that the signaling amount can be reduced.

Operation Example 1-4

In Operation Example 1-4, any one of the first information and the second information is indicated explicitly and the other information is indicated implicitly.

Hereinafter, a description will be given of an example in which the second information is indicated explicitly and the first information is indicated implicitly. Note that, the first information may be indicated explicitly and and the second information may be indicated implicitly.

Figure 17:
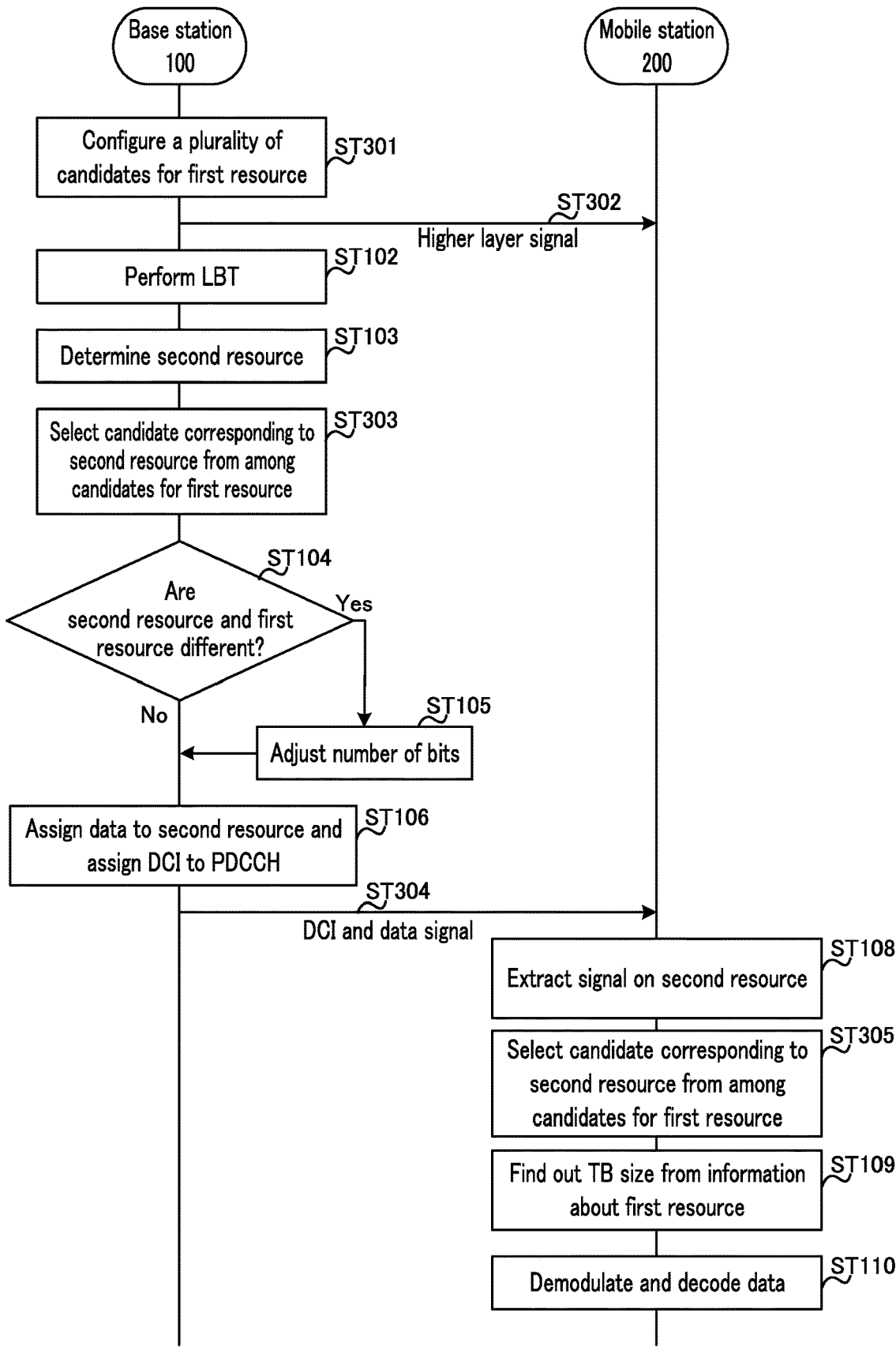
FIG. 17 is a sequence diagram illustrating an example of processing of the base station and mobile station, according to Operation Example 1-4 of Embodiment 1.

FIG. 17 is a sequence diagram illustrating an example of processing of base station 100 and mobile station 200 according to Operation Example 1-4. Note that, in FIG. 17, the processing which is identical to the processing in Operation Example 1-1 (e.g., FIG. 11) is assigned the same reference numeral, and the description of the processing will not be repeated, herein.

In FIG. 17, base station 100 configures a plurality of candidates for the first resource (ST301), for example, before performing LBT (ST102). Further, base station 100 may generate rate-matching output signals corresponding to the candidates for the first resource, respectively.

Base station 100 indicates the information relating to the configured candidates for the first resource to mobile station 200 via a higher layer signal (ST302), for example. Note that, the information relating to the configured candidates for the first resource may be indicated via another signaling (e.g., DCI) without limitation to the higher layer signal, and may be a fixed value shared between base station 100 and mobile station 200.

After performing LBT (ST102) and determining the second resource (ST103), base station 100 selects a candidate corresponding to the second resource from among the candidates for the first resource (ST303). Base station 100, for example, may select a candidate having a size close to the size of the second resource (e.g., closest size) from among the candidates for the first resource. Moreover, base station 100 selects a rate-matching output signal corresponding to the selected candidate for the first resource.

Base station 100, for example, transmits a DCI including the second information relating to the second resource and a data signal (e.g., data signal corresponding to the candidate selected in ST303) to mobile station 200 (ST304).

Mobile station 200, as in ST303, selects, from among the candidates for the first resource, a candidate having a size close to the size of the second resource indicated via a DCI (ST305). Mobile station 200, for example, may select a candidate closest to the size of the second resource from among the plurality of candidates for the first resource. As described, mobile station 200 determines the first information based on the second information included in the received DCI. In other words, the first information is implicitly indicated to mobile station 200 by the second information included in the DCI.

Mobile station 200 identifies the TB size of the received data signal based on the selected candidate for the first resource (ST109), and demodulates and decodes the data signal (ST110).

According to Operation Example 1-4, as in Operation Example 1-1, even in a case where the first resource and the second resource are different from each other, mobile station 200 can identify the allocation resource for a data signal and the TB size configured for the data signal and thus can appropriately perform reception processing (e.g., data extraction and decoding) on the data signal.

Moreover, according to Operation Example 1-4, the overhead for DCIs can be reduced because the first information is not explicitly indicated.

Further, according to Operation Example 1-4, for example, the candidate for the first resource (i.e., TB size) is determined in accordance with the second resource determined after completion of LBT. Thus, the TB size is determined in accordance with an available second resource based on the result of LBT, so that the resource utilization efficiency can be enhanced.

Note that, although the case has been described where base station 100 and mobile station 200 select a candidate closest to the size of the second resource from among a plurality of candidates for the first resource in Operation Example 1-4, the method of selecting a candidate is not limited to this case. Base station 100 and mobile station 200, for example, may select, from among a plurality of candidates for the first resource, a candidate having a largest size among sizes smaller than the size of the second resource. Alternatively, base station 100 and mobile station 200 may select, from among a plurality of candidates for the first resource, a candidate having a smallest size among sizes larger than the size of the second resource. With this method as well, base station 100 and mobile station 200 can configure an optimum TB size corresponding to an available second resource.

Further, although the case has been described where a plurality of candidates for the first resource are configured in Operation Example 1-4, a plurality of candidates for the second resource may be configured. Base station 100, for example, selects one candidate having a size close to the first resource from among the plurality of candidates for the second resource. Base station 100 may indicate the first information relating to the first resource to mobile station 200. Mobile station 200 selects, from among known candidates for the second resource, one candidate having a size close to the size of the first resource, based on the indicated first information, and identifies the data assignment position based on the selected candidate. With this method as well, mobile station 200 can appropriately decode the data signal based on the information on the TB size and the allocation resource.

Operation Examples 1-1 to 1-4 have been described thus far.

As described above, in this embodiment, base station 100 indicates, to mobile station 200, first information relating to a TB size configured for data (i.e., information relating to the first resource) and second information relating to a second resource determined after completion of LBT. Mobile station 200 controls reception of a data signal (e.g., identifying of an allocation resource for the data signal, deriving of a TB size, and decoding of the data signal) based on the first information and the second information indicated from base station 100.

Thus, even in a case where the first resource determined based on the TB size of data and the second resource to which the data is actually assigned are different from each other, for example, due to the impact of LBT, mobile station 200 can derive the TB size and determine how rate-matching has been applied to the downlink data in base station 100.

Thus, according to the present embodiment, mobile station 200 can appropriately receive and decode downlink data. As has been described thus far, according to the present embodiment, base station 100 and mobile station 200 can appropriately perform data communication in an unlicensed band such as NR-U.

Variation of Embodiment 1

Note that, the first information is not limited to the case where the first information indicates the number of symbols forming the first resource in Embodiment 1. The first information, for example, may indicate "a difference between the number of symbols forming the first resource and the number of symbols forming the second resource." Mobile station 200, for example, may estimate a size (e.g., the number of symbols) of the first resource based on the first information including the difference and the second information including the size of the second resource and identify the TB size. With this method as well, mobile station 200 can appropriately decode the data based on the information on the TB size and the allocation resource. In other words, it is only necessary for the information relating to the first resource to include information to identify the size of the first resource.

Further, the first information is not limited to the case where the first information indicates the number of symbols forming the first resource in Embodiment 1. The first information, for example, may indicate a TB size configured in mobile station 200. With this method as well, mobile station 200 can appropriately decode the data based on the information on the TB size and the allocation resource.

Further, the second information is not limited to the case where the second information indicates a combination of "first symbol position of the second resource (starting position S)" and "the number of symbols forming the second resource (L)" in Embodiment 1. The second information, for example, may indicate a combination of "first symbol position of the second resource (starting position S)" and "last symbol position (end position) of the second resource." In other words, it is only necessary for the second information to include information to identify the size and the position of the second resource.

Further, the "last symbol position of the second resource," for example, may be implicitly indicated to mobile station 200 via information indicating a configuration of Channel Occupancy Time (COT) or information indicating a slot format (e.g., Slot Format Indicator (SFI)). Base station 100, for example, may indicate that "the last symbol in which the downlink signal is transmitted is the X-th symbol" to mobile station 200 via COT configuration indication or SFI. Mobile station 200 may determine that the second resource ends at the X-th symbol based on the received COT configuration indication or SFI.

With this method as well, mobile station 200 can identify the allocation resource and appropriately decode the data. Further, the overhead for DCIs can be reduced because the information relating to the second resource is indicated simultaneously with the COT configuration or the slot format.

Further, although the "first symbol position of the second resource" is assumed to be a symbol number, i.e., the absolute position in Embodiment 1, another representation method may be used. The first symbol position of the second resource, for example, may be a relative position from the resource where a DCI is mapped, i.e., may be represented by an offset value. With this method as well, mobile station 200 can identify the allocation resource and appropriately decode the data.

Further, although the case has been described where the first information indicates the number of symbols forming the first resource in Embodiment 1, it is not limited to this case. The first information, for example, may include the first symbol position of the first resource (i.e., resource position) in addition to the number of symbols (i.e., resource amount) as with the second information. With this method as well, mobile station 200 can identify the TB size and appropriately decode the data.

Further, although the number of symbols forming a slot is set to 14 in Embodiment 1, the number of symbols forming a slot is not limited to 14 symbols, and may be another value (e.g., 12)

Embodiment 2

In Embodiment 2, a description will be given of transmission of downlink data relating to a frequency domain of NR-U in an unlicensed band.

A base station and a mobile station according to Embodiment 2 have basic configurations common to base station 100 and mobile station 200 according to Embodiment 1, so that a description will be given while FIGS. 9 and 10 are incorporated herein.

Hereinafter, a description will be given of each of Operation Examples 2-1 and 2-2 relating to indication of first information relating to a TB size configured for downlink data (or first resource determined based on the TB size) and second information relating to a second resource (e.g., PDSCH resource) actually allocated to the downlink data after completion of LBT.

Operation Example 2-1

Processing of base station 100 and mobile station 200 according to Operation Example 2-1 is similar to Operation Example 1-1 (e.g., see FIG. 11) but is different in that the first resource and the second resource are frequency resources.

In FIG. 11, base station 100, for example, determines a TB size and MCS for a data signal and determines the first resource (e.g., frequency resource) based on the TB size and MCS (ST101). Base station 100, for example, determines herein the first resource formed of 10 resources blocks (RBs) #0, #10, . . . #90 which belong to each of four subbands with subband #0 to #3, i.e., a total of 40 RBs (e.g., 480 subcarriers). Moreover, base station 100 applies error correction coding and rate-matching and/or the like to the data signal based on the first resource (e.g., the number of RBs or the number of subcarriers of the first resource).

Base station 100 performs LBT before transmitting a data signal (ST102). Upon completion of LBT, base station 100 determines a second resource (e.g., frequency resource) available for transmission of the data signal at the time of completion of LBT (ST103). In the example illustrated above, for example, base station 100 determines the second resource formed of 10 RBs of RB #0, #10, . . . #90 which belong to each of three subbands with subband #0 to #2, i.e., a total of 30 RBs (e.g., 360 subcarriers).

In a case where the first resource and the second resource are different from each other (ST104: Yes), base station 100 adjusts the number of bits of the data signal (i.e., rate-matching output signal) such that the number of bits of the data signal matches the second resource size (i.e., the resource amount) (ST105). Meanwhile, in a case where the first resource and the second resource are not different from each other (ST104: No), base station 100 performs processing of ST106 without adjusting the number of bits of the data signal.

In the example described above, the first resource (40 RBs=480 subcarriers) and the second resource (30 RBs=360 subcarriers) are different from each other. Thus, base station 100, for example, may delete (i.e., puncture) part of the data signal (e.g., the signal generated in ST101) to adjust the data signal to be the number of bits that can be mapped to 360 subcarriers.

Note that, base station 100 may adjust the number of bits of a data signal not only in a case where the second resource is smaller than the first resource (i.e., a case where the data signal is partly deleted), but also in a case where the second resource is larger than the first resource. In a case where the first resource includes 360 subcarriers and the second resource includes 480 subcarriers (not illustrated), for example, base station 100 may adjust the number of bits of the data signal by repeating a part of bits of the data signal (i.e., by repetition) such that the data signal is fittingly mapped to 480 subcarriers.

Base station 100, for example, assigns a data signal to the second resource and assigns a DCI to a PDCCH resource (ST106). Note that, the first information relating to the first resource and the second information relating to the second resource are included in the DCI, for example. Base station 100 transmits the downlink signal including the data signal and DCI to mobile station 200 (ST108).

Mobile station 200 extracts the data signal assigned to the second resource, based on the information relating to the second resource included in the DCI received from base station 100 (ST108).

Further, mobile station 200 identifies (i.e., finds out) the TB size for the data signal based on the information relating to the first resource, which is included in the DCI received from base station 100 (ST109). In a case where mobile station 200 determines that the first resource includes 480 subcarriers, based on the DCI, for example, mobile station 200 computes the TB size corresponding to 480 subcarriers (see, e.g., NPL 4).

Mobile station 200 demodulates and decodes the extracted data signal based on the computed TB size (ST110).

As described above, an example of the data transmission and reception method in base station 100 and mobile station 200, according to Operation Example 2-1, has been described thus far.

According to Operation Example 2-1, even in a case where the first resource and the second resource are different from each other, mobile station 200 can identify the allocation resource for a data signal and the TB size configured for the data signal and thus can appropriately perform reception processing (e.g., data extraction and decoding) on the data signal.

Note that, although the case has been described where the first information indicates a frequency band which is the first resource (e.g., information indicating a specific RB within a subband), it is not limited to this case. The first information, for example, indicates the number of subcarriers forming the first resource (i.e., the size or resource amount of the first resource). With this method as well, mobile station 200 can identify the TB size and appropriately decode the data.

Alternatively, the first information, for example, indicates "a difference between the number of subcarriers forming the first resource and the number of subcarriers forming the second resource." In this case, mobile station 200, for example, may estimate the size (e.g., the number of subcarriers) of the first resource based on the first information and the second information and identify the TB size. With this method as well, mobile station 200 can identify the TB size and appropriately decode the data.

Operation Example 2-2

In Operation Example 2-2, the second information is, for example, information indicating a subband available in the first resource (frequency resource, e.g., a plurality of subbands).

Note that, processing of base station 100 and mobile station 200 according to Operation Example 2-2 is similar to Operation Example 2-1 (e.g., see FIG. 11) but is different in that the information relating to the second resource, which is included in a DCI is different.

In a case where it is determined by LBT that the subbands with subband #0 to #2 are available and the subband with subband #3 is unavailable in base station 100, for example, the second information representing the information indicating the availability of each subband (e.g., bit map "1110") may be indicated to mobile station 200. Further, base station 100 may indicate this second information and the first information (e.g., information similar to Operation Example 2-1). In other words, base station 100 indicates the first information indicating a frequency resource determined based on the TB size configured for the downlink data and the second information indicating at least one band among a plurality of bands included in the frequency resource indicated by the first information.

Mobile station 200 may determine that "the second resource is a resource that belongs to a subband available in the indicated first resource" when receiving the first information and the second information. Thus, mobile station 200 can extract a data signal from the second resource.

According to Operation Example 2-2, as in Operation Example 2-1, even in a case where the first resource and the second resource are different from each other, mobile station 200 can identify the allocation resource for a data signal and the TB size configured for the data signal and thus can appropriately perform reception processing (e.g., data extraction and decoding) on the data signal.

Moreover, according to Operation Example 2-2, the second information is not information indicating the size and position of the second resource themselves and is information indicating the availability (available or unavailable) of each resource, so that the overhead for DCIs can be reduced as compared with Operation Example 2-1.

Note that, the resource unit subject for the availability indicated in the second information is not limited to subbands and may be other units. The resource unit for the availability, for example, may be a subcarrier unit, a resource block unit, an interlace unit, a cluster unit of interlace and/or the like. With this method as well, mobile station 200 can appropriately decode the data based on the information on a TB size and allocation resource.

Operation Examples 2-1 and 2-2 have been described thus far.

As described above, in this embodiment, base station 100 indicates, to mobile station 200, the first information relating to a TB size configured for data (i.e., information relating to the first resource), and second information relating to the second resource determined after completion of LBT. Mobile station 200 controls reception of a data signal (e.g., identifying of an allocation resource for the data signal, deriving of a TB size, and decoding of the data signal) based on the first information and the second information indicated from base station 100.

Thus, even in a case where the first resource to be determined based on the TB size of data and the second resource to which the data is actually assigned are different from each other, for example, due to the impact of LBT, mobile station 200 can derive the TB size and determine how rate-matching has been applied to the downlink data in base station 100.

Thus, according to the present embodiment, mobile station 200 can appropriately receive and decode downlink data. As has been described thus far, according to the present embodiment, base station 100 and mobile station 200 can appropriately perform data communication in an unlicensed band such as NR-U.

Variation of Embodiment 2

Note that, the first information is not limited to a case where the first information indicates the number of subcarriers forming the first resource in Embodiment 2. The first information, for example, may indicate a TB size. With this method as well, mobile station 200 can appropriately decode the data based on the information on the TB size and the allocation resource.

Further, in Embodiment 2, an assumption is made that one first resource or one second resource is mapped over a plurality of subbands, but without limitation to this case, the first resource or the second resource may be independently configured in each subband. Moreover, in this case, one TB may be transmitted and received over a plurality of subbands, and a plurality of TBs different between subbands may be transmitted and received.

Each embodiment of the present disclosure has been described thus far.

Other Embodiments

One exemplary embodiment of the present disclosure described above may be applied to any slot. Alternatively, one exemplary embodiment of the present disclosure may be applied to a slot immediately after completion of LBT and may not be applied to the other slots.

Further, in the embodiments described above, a deletion or repetition target bit sequence in the process of deleting or repeating a part of bits of a data signal corresponding to the size of the first resource for the purpose of matching with the second resource may be a first bit sequence and/or a last bit sequence of of the data signal. Moreover, the deletion or repetition target bit sequence may be in units of code blocks (CBs) or CB groups (CBGs).

Further, in the embodiments described above, a description has been given of the case where base station 100 adjusts the number of bits in a process different from rate-matching for the purpose of matching with the second resource. Base station 100, however, may adjust the number of bits by rate-matching in the processing of matching with the second resource. Accordingly, the configuration of base station 100 can be simplified.

Moreover, in the embodiments described above, the number of patterns of a control signal indicating the first information (i.e., information relating to a TB size) or the number of bits of a control signal corresponding to the first information may be larger than the number of patterns of a control signal indicating the second information (i.e., information relating to the second resource) or the number of bits of a control signal corresponding to the second information. Accordingly, base station 100 can more flexibly configure the TB size and the first resource. Alternatively, the number of patterns of a control signal indicating the second information or the number of bits of a control signal corresponding to the second information may be larger than the number of patterns of a control signal indicating the first information or the number of bits of a control signal corresponding to the first information. Accordingly, base station 100 can more flexibly configure the second resource.

Moreover, in the embodiments described above, in a case where there is an interval between completion of LBT and transmission using the second resource, base station 100 may transmit a reservation signal (e.g., referred to as a reservation signal or dummy signal) during this interval. Thus, it is made possible to prevent a neighboring radio device from completing carrier sense (e.g., LBT) during this interval and/or to prevent radio devices from interfering with each other during this interval.

Although downlink is assumed in the above embodiments, application to uplink or sidelink between mobile stations (e.g. Device-to-Device communication, Vehicle-to-Vehicle communication) is also possible.

Further, in the embodiments described above, the term "higher layer signal" may be referred to as "RRC signal (RRC signaling)" or "MAC signal (MAC signaling)," for example.

Moreover, the DCI in each of the embodiments may be mapped to PDCCH which may be received by only one mobile station (e.g., UE-specific PDCCH) or may be mapped to PDCCH which may be received by a plurality of mobile stations (e.g., Group-common PDCCH).

Moreover, although the case has been descried where the first information and the second information in each of the embodiments indicate a parameter relating to a symbol or a subcarrier (the number of or position of symbols or subcarriers), it is not limited to this case. The first information and the second information, for example, may indicate a parameter relating to another time resource different from a symbol or another frequency resource different from a subcarrier (e.g., resource amount or resource position).

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and Internet of Things ("IoT" (every "things" that may exist on networks.

In addition to data communication via cellular systems, wireless LAN systems, communication satellite systems and/or the like, communication includes data communication via a combination of these systems.

Moreover, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A mobile station according to one exemplary embodiment of the present disclosure includes: reception circuitry, which, in operation, receives first information relating to a size configured for data, and second information relating to a resource to which the data is assigned; and control circuitry, which, in operation, controls reception of the data based on the first information and the second information.

In one exemplary embodiment of the present disclosure, the reception circuitry receives information indicating any one of a plurality of candidates for a combination of the first information and the second information.

In one exemplary embodiment of the present disclosure, the reception circuitry receives different control signals respectively including the first information and the second information.

In one exemplary embodiment of the present disclosure, the reception circuitry receives a higher layer signal including any one of the first information and the second information and receives a downlink control signal including the other one of the first information and the second information.

In one exemplary embodiment of the present disclosure, the reception circuitry receives a signal including any one of the first information and the second information, and the control circuitry determines the other one of the first information and the second information based on the any one of the first information and the second information.

In one exemplary embodiment of the present disclosure, the first information indicates a resource amount of a time resource determined based on the size configured for the data.

In one exemplary embodiment of the present disclosure, the first information indicates a difference between a resource amount of a time resource determined based on the size configured for the data and a resource amount of a time resource to which the data is assigned.

In one exemplary embodiment of the present disclosure, the first information indicates the size configured for the data.

In one exemplary embodiment of the present disclosure, the first information indicates a resource amount of a time resource determined based on the size configured for the data and indicates a position of the time resource.

In one exemplary embodiment of the present disclosure, the second information indicates a resource amount of a time resource to which the data is assigned, and indicates a position of the time resource.

In one exemplary embodiment of the present disclosure, the second information indicates a starting position and an end position of a time resource to which the data is assigned.

In one exemplary embodiment of the present disclosure, the first information indicates a frequency resource determined based on the size configured for the data.

In one exemplary embodiment of the present disclosure, the first information indicates a resource amount of a frequency resource determined based on the size configured for the data.

In one exemplary embodiment of the present disclosure, the first information indicates a difference between a resource amount of a frequency resource determined based on the size configured for the data and a resource amount of a frequency resource to which the data is assigned.

In one exemplary embodiment of the present disclosure, the second information indicates a frequency resource to which the data is assigned.

In one exemplary embodiment of the present disclosure, the first information indicates a frequency resource determined based on the size configured for the data, and the second information indicates at least one band of a plurality of bands included in the frequency resource.

In one exemplary embodiment of the present disclosure, the at least one band is a band determined by carrier sense to be available among the plurality of bands.

In one exemplary embodiment of the present disclosure, a resource amount of a resource determined based on the size configured for the data is larger than a resource amount of a resource to which the data is assigned.

In one exemplary embodiment of the present disclosure, a resource amount of a resource determined based on the size configured for the data is smaller than a resource amount of a resource to which the data is assigned.

In one exemplary embodiment of the present disclosure, the first information is determined before carrier sense is performed.

In one exemplary embodiment of the present disclosure, the second information is determined based on a result of carrier sense.

A base station according to one exemplary embodiment of the present disclosure includes: transmission circuitry, which, in operation, transmits first information relating to a size configured for data, and second information relating to a resource to which the data is assigned; and control circuitry, which, in operation, controls transmission of the data based on the first information and the second information.

A reception method according to one exemplary embodiment of the present disclosure includes: receiving, by a mobile station, first information relating to a size configured for data, and second information relating to a resource to which the data is assigned; and controlling, by the mobile station, reception of the data based on the first information and the second information.

A transmission method according to one exemplary embodiment of the present disclosure includes: transmitting, by a base station, first information relating to a size configured for data, and second information relating to a resource to which the data is assigned; and controlling, by the base station, transmission of the data based on the first information and the second information.

INDUSTRIAL APPLICABILITY

One exemplary embodiment of the present disclosure is useful in mobile communication systems.

REFERENCE SIGNS LIST

100 Base station
101, 206 Controller
102 Encoder
103 Rate matcher
104 Modulator
105 Number-of-bits re-adjuster
106 Signal mapper
107 Transmitter
108, 201 Antenna
200 Mobile station
203 Signal separator
204 Demodulator
205 Decoder

The invention claimed is:

1. A communication apparatus, comprising:
reception circuitry, which, in operation, receives first time resource information relating to a first resource configured for data, and second time resource information relating to a second resource configured for the data; and
control circuitry, which, in operation, controls reception or transmission of the data based on the first time resource information and the second time resource information,
wherein,
the first time resource information and the second time resource information are received in one field of a downlink control information (DCI), and
the first resource at least partially overlaps with the second resource in a time domain.

2. The communication apparatus according to claim 1, wherein a size of the data is adjusted based on the second time resource information in a case the second resource is different from the first resource.

3. The communication apparatus according to claim 1, wherein a resource amount of the first resource is smaller than that of the second resource.

4. The communication apparatus according to claim 1, wherein the first time resource information indicates a first time resource, and the second time resource information indicate a second time resource.

5. The communication apparatus according to claim 1, wherein the first time resource information indicates a difference between a resource amount of the first resource and that of the second resource.

6. A communication method, comprising:
receiving first time resource information relating to a first resource configured for data, and second time resource information relating to a second resource configured for the data; and
controlling reception or transmission of the data based on the first time resource information and the second time resource information,
wherein,
the first time resource information and the second time resource information are received in one field of a downlink control information (DCI), and
the first resource at least partially overlaps with the second resource in a time domain.

7. The communication method according to claim 6, wherein a size of the data is adjusted based on the second time resource information in a case the second resource is different from the first resource.

8. The communication method according to claim 6, wherein a resource amount of the first resource is smaller than that of the second resource.

9. The communication method according to claim 6, wherein the first time resource information indicates a first time resource, and the second time resource information indicate a second time resource.

10. The communication method according to claim 6, wherein the first time resource information indicates a difference between a resource amount of the first resource and that of the second resource.

* * * * *